United States Patent [19]
Yamaguchi

[11] Patent Number: 4,881,002
[45] Date of Patent: Nov. 14, 1989

[54] MINIATURE MOTOR
[75] Inventor: Hitoshi Yamaguchi, Matsudo, Japan
[73] Assignee: Mabuchi Motor Co., Ltd., Chiba, Japan
[21] Appl. No.: 205,196
[22] Filed: Jun. 10, 1988
[30] Foreign Application Priority Data
   Jun. 19, 1987 [JP]  Japan ............... 62-94445[U]
[51] Int. Cl.$^4$ ............................................. H02K 1/22
[52] U.S. Cl. ............................ 310/261; 310/40 MM;
          310/111; 310/154; 310/276; 310/269
[58] Field of Search ............... 310/264, 261, 262, 265,
       310/269, 154, 155, 216, 46, 177, 111, 51, 40 MM

[56]      References Cited
         U.S. PATENT DOCUMENTS
   3,064,150  11/1962  Barnes .................................. 310/46
   4,280,072   7/1981  Goton ................................... 310/156

Primary Examiner—R. Skudy
Attorney, Agent, or Firm—McGlew & Tuttle

[57]          ABSTRACT

A miniature motor comprising a stator having permanent magnets constituting a two-pole field, and a rotor having rotor windings wound on a rotor core of a three-pole construction, in which the rotor core is formed in such a manner that the cross-sectional shape of the rotor core normal to the motor shaft is made symmetrical with respect to the radial center line of each pole thereof and that the gap between the permanent magnets and a predetermined range from the center line of the arc-shaped outer periphery of the rotor core facing the permanent magnet is made larger than the gap between the permanent magnet and at least part of the other range of the outer periphery of the rotor core.

6 Claims, 4 Drawing Sheets

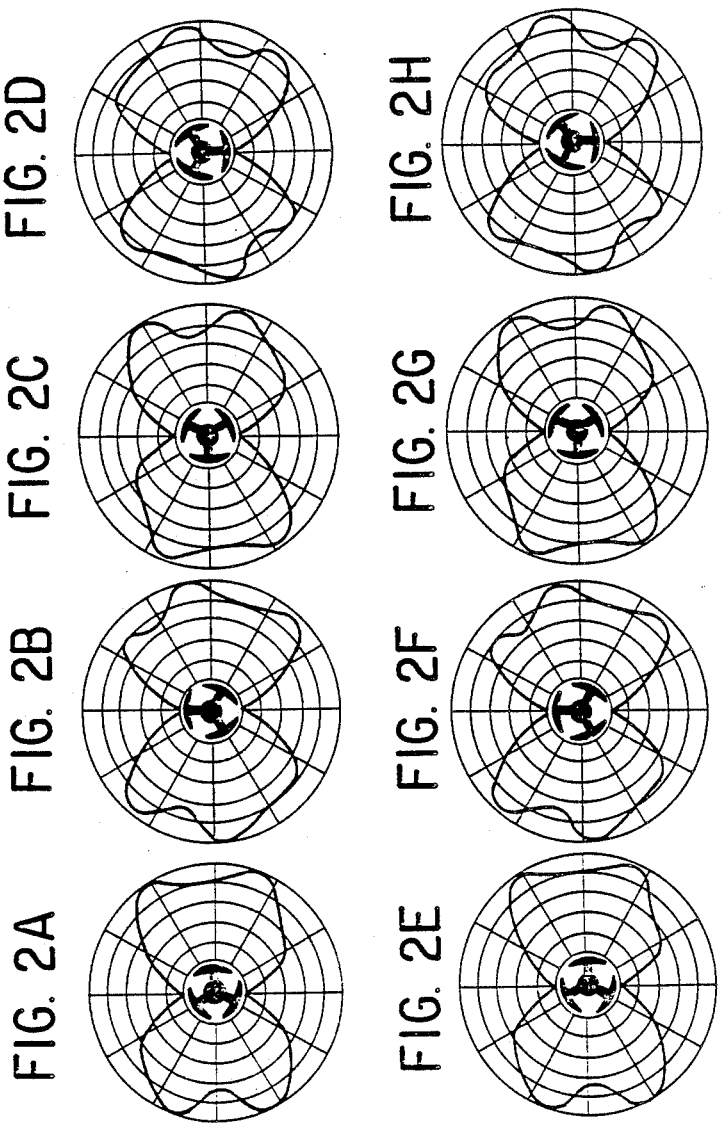

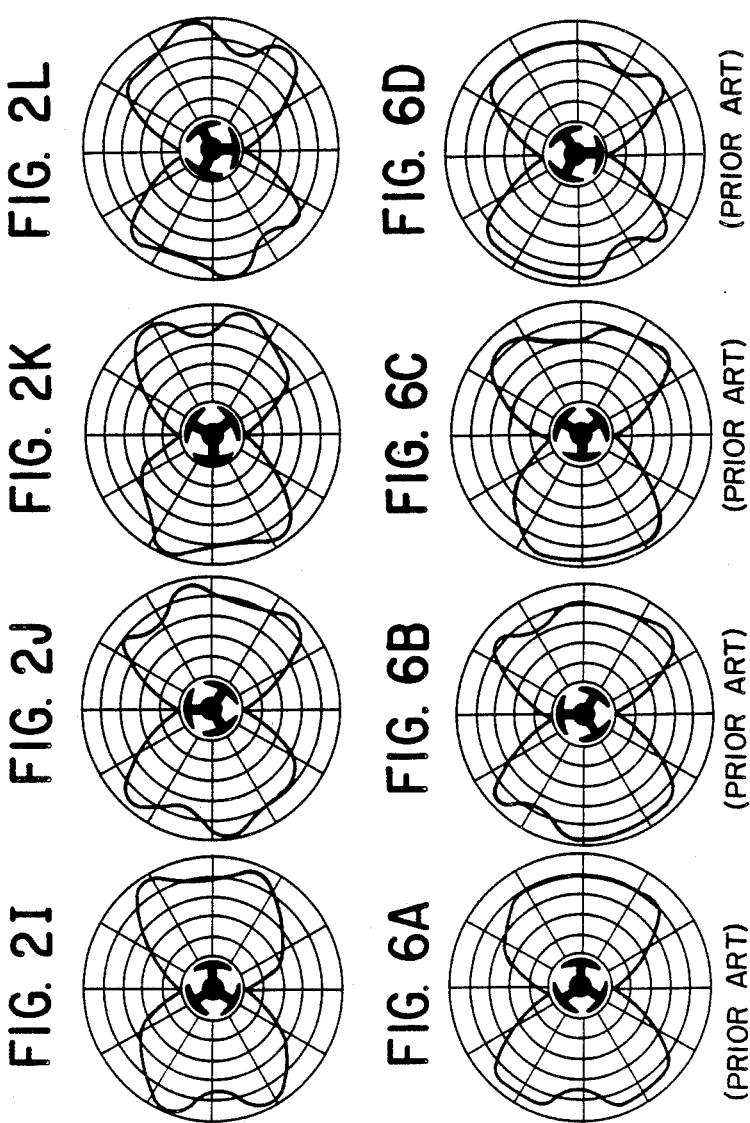

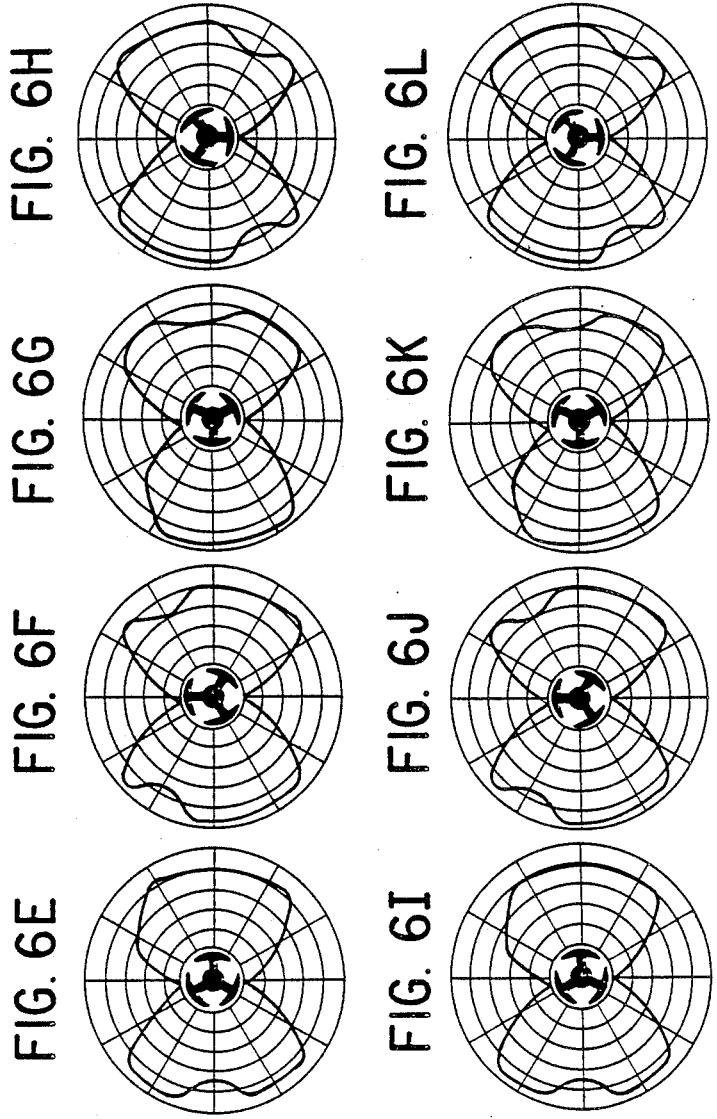

MINIATURE MOTOR

BACKGROUND OF THE INVENTION

This invention relates generally to a miniature motor, and more particularly to a miniature motor comprising a stator having permanent magnets constituting a two-pole field, and a rotor having rotor windings wound on a rotor core of a three-pole construction, in which the rotor core is formed in such a manner that the gap between the permanent magnet and a predetermined range at the central part of the outer periphery of the rotor core facing the permanent magnet is made larger than the gap between the permanent magnet and the other range of the outer periphery of the rotor core.

DESCRIPTION OF THE PRIOR ART

In general, the miniature motor is composed of a stator having a pair of permanent magnets and a rotor having rotor windings (not shown) wound on a rotor core of a three-pole construction, as shown in FIG. 5.

FIG. 5 is a cross-sectional view of a miniature motor of a commonly found, conventional type. Reference numeral 1 in the figure refers to a motor case; 2 to a permanent magnet; 3 to a magnet stopper; 4 to a magnet retaining spring; 5 to a rotor core; 5-1 to a pole; 5-2 to the outer periphery of the pole 5-1; and 6 to a motor shaft; respectively.

In the conventional type of miniature motor shown in FIG. 5, the outer periphery 5-2 of the pole 5-1 each of the rotor core 5 is formed into a substantially arc shape, and adapted so that the gap between the outer periphery 5-2 and the permanent magnet 2 is almost uniform over the entire circumference of the rotor core 5, with both ends of the motor shaft 6 being supported by bearings (not shown). Whereas a magnet attraction force is produced between the permanent magnet 2 and the rotor core 5, the magnetic attraction force, when produced unwantedly in a point-asymmetrical fashion with respect to the motor shaft 6, tends to cause the motor shaft 6 to wobble in the bearings as the rotor core 5 revolves, generating a rolling noise.

FIGS. 6A through 6L are diagrams illustrating magnetic flux distributions in the motor at 30-degree angular positions in a revolution of the miniature motor shown in FIG. 5.

In other words, FIGS. 6A through 6L illustrate magnetic flux distributions in the motor at 30-degree angular positions in a clockwise revolution of the motor, starting from the state where the rotor core 5 is in an angular position shown in FIG. 6A to the state where the rotor core 5 returns to the position shwon in FIG. 6A.

As is evident from FIG. 6A, the conventional type of miniature motor shown in FIG. 5 has point-asymmetrical magnetic flux distributions with respect to the motor shaft 6, particularly at angular positions at which the radial center of the pole 5-1 each of the rotor core 5 agrees with the center of the permanent magnet 2 (as shown in FIGS. 6A, 6C, 6E, 6G, 6I, and 6K).

In the conventional type of miniature motor shown in FIG. 5, therefore, the magnetic attraction force generated by the permanent magnet 2 and the rotor core 5 tends to be out of balance, causing the revolving motor shaft 6 to wobble seriously in the bearings, leading to an unwanted rolling noise, as noted earlier.

As a means for solving the aforementioned problem, various measures have been conceived, such as selection and adjustment of the type and amount of addition of bearing lubricant, and adjustment of clearance between the motor shaft and the bearings. The great degree of wobbling of the motor shaft 6 during revolution, however, tends to accelerate the wear of the bearings, increasing the clearance between the motor shaft and the bearings. This could result in various unwanted problems, including a rolling noise, or burn-out and sticking between the motor shaft and the bearings.

SUMMARY OF THE INVENTION

This invention is intended to overcome these problems. To achieve this object, this invention provides a miniature motor comprising a stator having permanent magnets constituting a two-pole field, and a rotor having rotor windings wound on a rotor core of a three-pole construction, in which the rotor core is formed in such a manner that the cross-sectional shape of the rotor core normal to the motor shaft is made symmetrical with respect to the radial center line of each pole thereof and that the gap between the permanent magnets and a predetermined range from the center line of the arc-shaped outer periphery of the rotor core facing the permanent magnet is made larger than the gap between the permanent magnet and at least part of the other range of the outer periphery of the rotor core.

These and other objectives and advantages of this invention will become more apparent upon a reading of the following detailed description and FIGS. 1 through 4.

BRIEF DESCRIPTION OF THE INVENTION:

FIGS. 2A through 2L are diagrams illustrating magnetic flux distribution in the motor shown in FIG. 1A.

FIGS. 6A through 6L are diagrams showing magnetic flux distributions in the conventional type of motor shown in FIG. 5.

Figure 1A:
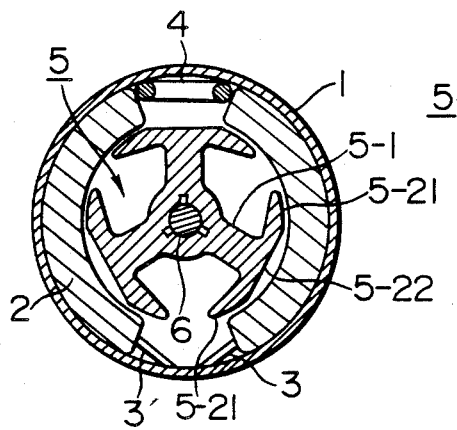
FIGS. 1A and 1B are diagrams of assistance in explaining a miniature motor embodying this invention, FIG. 1A being a cross-sectional view of the same, and FIG. 1B being a front view of the rotor core thereof.
Figure 1B:
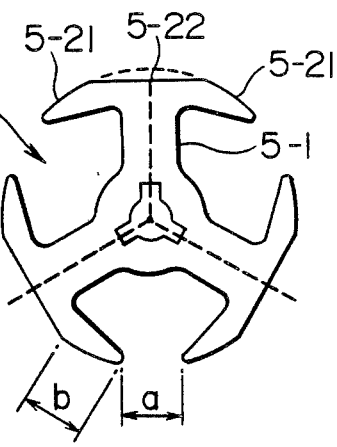
Figure 3:
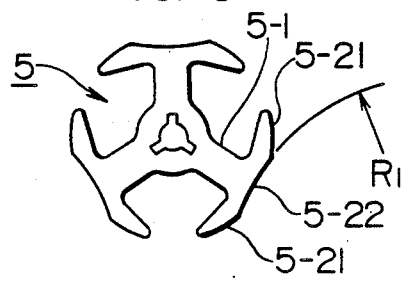
FIGS. 3 and 4 are front views of rotor cores used in other embodiments of this invention.
Figure 4:
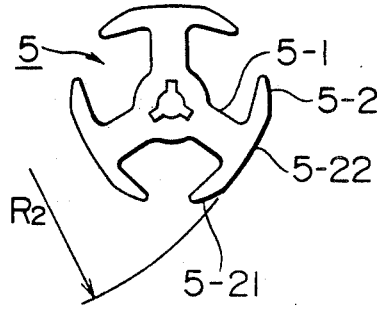
Figure 5:
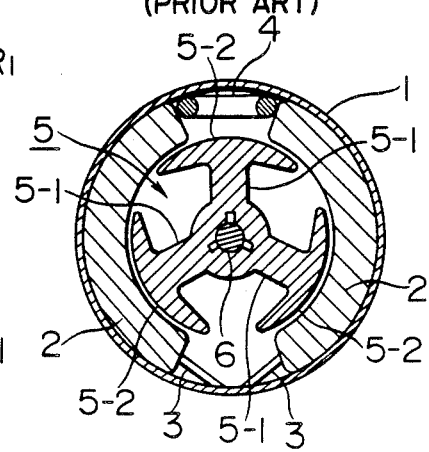
FIG. 5 is a cross-sectional view of a miniature motor of a conventional type.

DETAILED DESCRIPTION OF THE EMBODIMENTS:

FIGS. 1A and 1B are diagrams of assistance in explaining a miniature motor embodying this invention, FIG. 1A being a cross-sectional view of the same, and FIG. 1B being a front view of the rotor core thereof. FIGS. 2A through 2L are diagrams illustrating magnetic flux distributions in the motor shown in FIGS. 1A. FIGS. 3 and 4 are front views of rotor cores used in other embodiments of this invention. In the figures, reference numeral 5-21 refers to an arc-shaped portion; and 5-22 to a wide-gap portion. Other numerals correspond with like numerals in FIG. 5.

The miniature motor embodying this invention has such a construction that the outer periphery of the pole 5-1 of the rotor core 5 consists of an arc-shaped portion 5-21 having a uniform gap facing the permanent magnet 2 and a wide-gap portion 5-22 having a gap wider than the gap between the arc-shaped portion 5-21 and the permanent magnet 2, as shown in FIG. 1A. By providing the wide-gap portion 5-22 on part of the outer periphery of the rotor core 5, a magnetic flux distribution that is point-symmetrical with respect to the motor shaft 6 can be obtained, as will be described later with reference to FIG. 2A through 2L. That is, the magnetic attraction force generated between the permanent magnet 2 and the rotor core 5 is balanced over the entire circumference of the revolving rotor core 5 by making the magnetic flux distribution in the motor point-symmetrical with respect to the motor shaft 6. Thus, the mtor shaft 6 is prevented from wobbling during motor rotation.

In the embodiment shown in FIG. 1A, the wide-gap portion 5-22 constituting part of the outer periphery of the rotor core 5 is formed into a flat surface. That is, the wide-gap portion 5-22 is formed by cutting a part of the arc-shaped outer periphery (as shown by a dotted line in the figure) of the rotor core 5. The rotor core 5 of a laminated-core type can also be formed by laminating core sheets cut in advance into a shape shown by solid lines in FIG. 1B.

In forming the wide-gap portion 5-22, it is desirable to set the ratio of the length (shown by arrow b in the figure) of the arc-shaped portion 5-21 to the distance (shown by arrow a) between the tips of the opposing poles 5-1 to a range of 0.8–2.2. This is because a b-to-a ratio less than 0.8 would reduce the counter-electromotive force $E_c$ generated by the rotor windings (not shown), increasing the input current to the rotor windings. This would increase heat loss in the rotor windings, reducing the life of the motor. A b-to-a ratio more than 2.2, on the other hand, would destroy the balance of magnetic attraction force between the permanent magnet 2 and the rotor core 5.

FIGS. 2A through 2L are diagrams showing magnetic flux distributions in the motor at 30-degree angular positions in one revolution of the miniature motor shown in FIG. 1A. In other words, FIGS. 2A through 2L illustrate magnetic flux distributions in the motor at 30-degree angular positions in a clockwise revolution of the motor, starting from the state where the rotor core 5 is in an angular position shown in FIG. 2A to the state where the rotor core 5 returns to the position shown in FIG. 2A. As is apparent from FIG. 2A–2L, the miniature motor shown in FIG. 1A has magnetic flux distributions that are substantially point-symmetrical with respect to the motor shaft 6 at any angular positions. Consequently, the magnetic attraction force generated between the permanent magnet 2 and the rotor core 5 is balanced over the entire circumference of the rotor core 5, preventing the motor shaft 6 from unwantedly wobbling during motor revolution. This helps prevent the generation of a rolling noise in the bearings (not shown) and the abnormal wear of the bearings as well.

Although the foregoing description has been devoted mainly to the embodiment shown in FIG. 1A, this invention is not limited to the embodiment shown in FIG. 1A. The same effects as expected with the embodiment shown in FIG. 1A can also be accomplished in a miniature motor using a rotor core shown in FIGS. 3 or 4.

The embodiment shown in FIG. 3 is concerned with a rotor core 5 with a wide-gap portion 5-22 having a radius of curvature $R_1$ as shown in the figure, with the center thereof located on the opposite side of the motor shaft 6.

The embodiment shown in FIG. 4, on the other hand, is concerned with a rotor core 5 with a wide-gap portion 5-22 having a radius of curvature $R_2$ as shown in the figure, with the center thereof located on the same side of the motor shaft 6.

As described above, this invention makes is possible to balance the magnetic attraction force generated between the permanent magnet and the rotor core over the entire circumference of the revolving rotor core to prevent the motor shaft from unwantedly wobbling during motor rotation so as to prevent the generation of rolling noise in the bearings and the abnormal wear of the bearings by providing a miniature motor comprising a stator having permanent magnets constituting a two-pole field, and a rotor having rotor windings wound on a rotor core of a·three-pole construction, which uses a rotor core formed in such a manner that the gap between the permanent magnets and the arc-shaped outer periphery of the rotor core facing the permanent magnet within a predetermined range from the center line thereof is made larger than the gap between the permanent magnet and the outer periphery of the rotor core within at least part of other range.

What is claimed is:

1. A miniature motor comprising a stator having permanent magnets constituting a two-pole field, and a rotor having rotor windings wound on a rotor core of a three-pole construction, each rotor core pole of said rotor core is formed in such a manner that the cross-sectional shape of said rotor core pole viewed in a direction normal to a motor shaft is symmetrical with respect to a radial center line of each pole of said rotor core and that at each rotor core pole a gap is formed between said permanent magnet and a predetermined range from said center line of an arc-shaped outer periphery of said rotor core facing said permanent magnet which is larger than a gap formed between said permanent magnet and other ranges of the outer periphery of said rotor core.

2. A miniature motor as claimed in claim 1 wherein said predetermined range from said center line of the outer periphery of said rotor core is planar.

3. A miniature motor as claimed in claim 1 wherein said predetermined range from said center line of the outer periphery of said rotor core is formed along a radius of curvature, said radius of curvature having a center located away from the outer periphery in a direction opposite the direction of said motor shaft.

4. A miniature motor as claimed in claim 1 wherein said predetermined range from said center line of the outer periphery of said rotor core is formed along a radius of curvature different from a radius of curvature an arc of said permanent magnet is formed along, with the center of said predetermined range radius of curvature located on the same side as said motor shaft.

5. A miniature motor comprising a stator having permanent magnets constituting a two-pole field, and a rotor having rotor windings wound on a rotor core of a three-pole construction, each rotor core pole of said rotor is formed in such a manner that the cross-sectional shape of said rotor core pole viewed in a direction normal to a motor shaft is symmetrical with respect to a radial center line of each pole of said rotor core and that at each rotor core pole a gap is formed between said permanent magnet and a predetermined range from said center line of an arc-shaped outer periphery of said rotor core facing said permanent magnet which is larger than a gap formed between said permanent magnet and other ranges of the outer periphery of said rotor core, said predetermined range from said center line of the outer periphery of said rotor core being planar.

6. A miniature motor comprising:

a stator having a permanent magnet constituting a two-pole field, said magnet having an inner arc with a radius of curvature defining a rotor space;

a rotor having rotor windings wound on a rotor core of a three-pole construction, said rotor being mounted on a shaft for rotation within said rotor space, each rotor core pole having a radial center line passing through said shaft radially outwardly, each of said rotor core poles having an outer periphery surface with first and second peripheral surface areas defined along a radius of curvature with a center substantially coinciding with a center of the radius of curvature of the arc of the permanent magnets, said first and second peripheral surface areas forming a gap with the inner surface of the permanent magnets and each of said rotor core pole portions having a central outer peripheral area spaced from said permanent magnets to define a gap which is larger than the gap between said first and second outer peripheral surface area gaps.

* * * * *